US007859719B2

(12) United States Patent
Tomomatsu

(10) Patent No.: US 7,859,719 B2
(45) Date of Patent: Dec. 28, 2010

(54) PRINT CONTROL PROGRAM, PRINT CONTROL APPARATUS, AND PRINT CONTROL METHOD

(75) Inventor: Yoshiaki Tomomatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 997 days.

(21) Appl. No.: 11/671,012

(22) Filed: Feb. 5, 2007

(65) Prior Publication Data
US 2007/0195361 A1 Aug. 23, 2007

(30) Foreign Application Priority Data
Feb. 20, 2006 (JP) ............... 2006-043162

(51) Int. Cl.
  *H04N 1/60* (2006.01)
  *G06F 3/12* (2006.01)
  *G06K 15/00* (2006.01)
  *G06K 9/00* (2006.01)
(52) U.S. Cl. ............... 358/1.9; 358/1.18; 358/501; 358/518; 358/1.15; 382/162; 382/167
(58) Field of Classification Search ............... 358/1.9, 358/1.18, 501, 504, 518, 520, 523, 1.13; 382/162, 167; 345/700, 776, 777, 840; 399/81, 399/82, 83, 84, 85, 86, 87
See application file for complete search history.

(56) References Cited

U.S. PATENT DOCUMENTS 6,587,129 B1 * 7/2003 Lavendel et al. ............ 715/776
6,924,826 B1 * 8/2005 Nakagiri et al. ............ 715/700
7,054,035 B2 * 5/2006 Zeng et al. ............ 358/1.9
2002/0196346 A1 12/2002 Nishio et al.
2004/0136020 A1 7/2004 Kumada
2005/0286100 A1 12/2005 Uotani et al.

FOREIGN PATENT DOCUMENTS

JP 2003-244468 8/2003

OTHER PUBLICATIONS

Search Report, issued on Mar. 26, 2009, corresponding to European Patent Application No. 07102379.0.

* cited by examiner

*Primary Examiner*—Charlotte M Baker
(74) *Attorney, Agent, or Firm*—Fitzpatrick, Cella, Harper & Scinto

(57) ABSTRACT

According to the present invention, a print control apparatus for displaying a print preview, comprises the units adapted to: spool print data created by application; issue a rendering instruction of the spooled print data to a graphic engine together with output information indicating one of a preview setting and a print setting; return a response about one of a color profile for previewing when the output information indicates the preview setting and a color profile for printing when the output information indicates the print setting, as a response to an inquiry about a color profile from the graphic engine that receives the rendering instruction; and display image data rendered by the graphic engine when the output information indicates the preview setting, and outputting the rendered image data to the printer when the output information indicates the print setting.

6 Claims, 16 Drawing Sheets

FIG. 4

|  |  |
|---|---|
| dmDeviceName | DEVICE NAME |
| dmSpecVersion | VERSION NUMBER OF DEVMODE DATA SPECIFICATION |
| dmDriverVersion | VERSION NUMBER OF DRIVER |
| dmSize | SIZE OF DEVMODE DATA EXCEPT FOR dmDriverData MEMBER |
| dmDriverExtra | BYTE LENGTH OF PRIVATE DRIVER DATA THAT FOLLOWS THIS DATA |
| dmFields | DESIGNATE MEMBER INITIALIZED BY MEMBER |
| dmOrientation | ORIENTATION OF PAPER |
| 401 ~ dmPaperSize | SIZE OF PAPER TO BE PRINTED |
| dmPaperLength | PAPER LENGTH (UNIT : 1 / 10 mm) |
| dmPaperWidth | PAPER WIDTH (UNIT : 1 / 10 mm) |
| ⋮ | ⋮ |
| 404 ~ dmPrintQuality | PRINTER RESOLUTION |
| dmColor | SET COLOR AND MONOCHROME IN COLOR PRINTER |
| ⋮ | ⋮ |
| 405 ~ dmICMMethod | WHETHER OR NOT TO EXECUTE ICM, AND WHERE TO EXECUTE |
| ⋮ | ⋮ |
| 402 ~ dmMediaType | PAPER TYPE |
| 403 ~ dmDitherType | HALFTONE METHOD |
| ⋮ | ⋮ |
| dmDriverData | DEVICE-UNIQUE INFORMATION |
| 406 ~ dmxxxxx | COLOR PROFILE ID |
| 407 ~ dmyyyyy | PREVIEW |

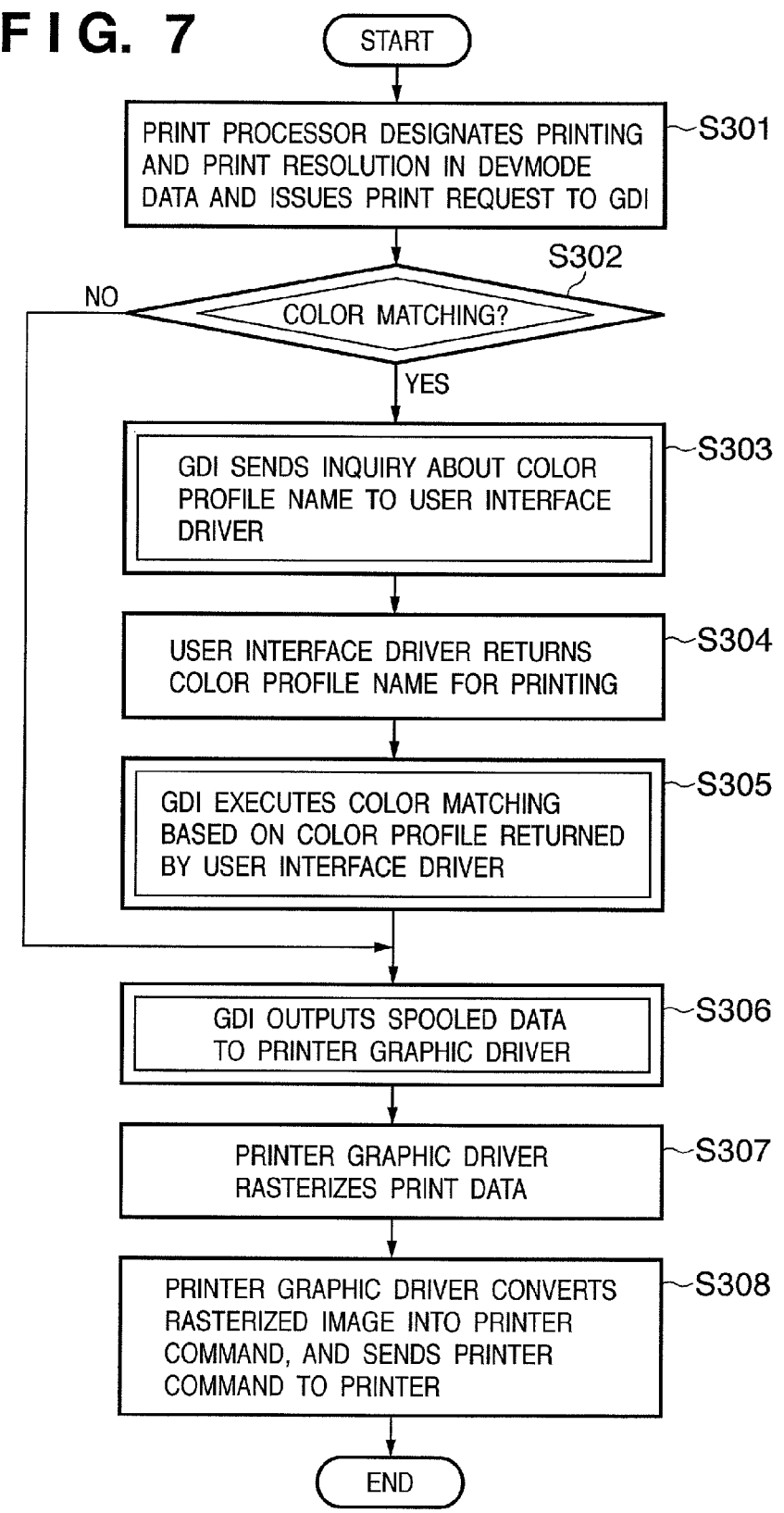

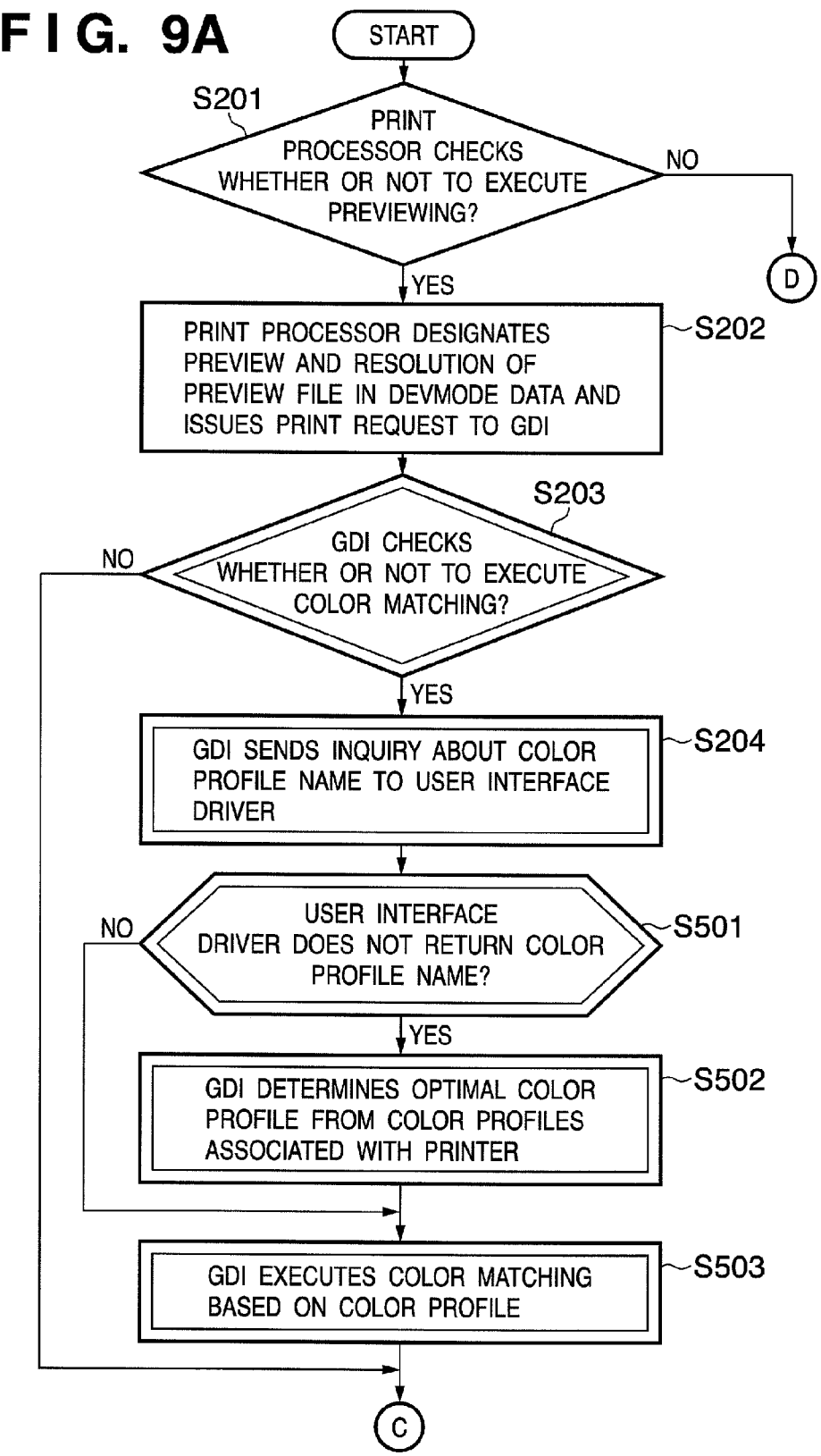

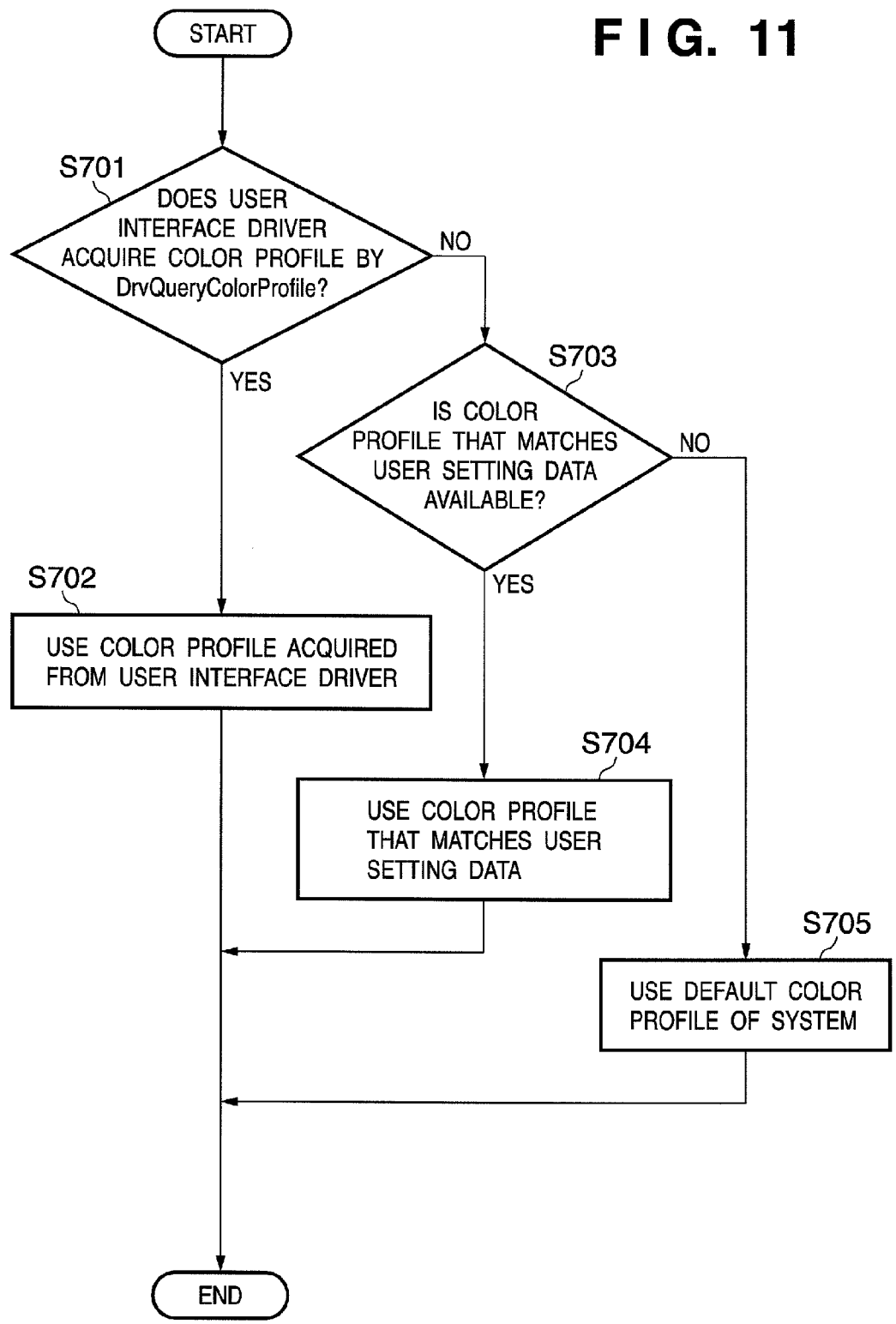

PRINT CONTROL PROGRAM, PRINT CONTROL APPARATUS, AND PRINT CONTROL METHOD

BACKGROUND OF THE INVENTION

1. Field of the Invention

The present invention relates to a print control program, print control apparatus, and print control method, which have a display function of a preview image of an image to be printed on a paper sheet based on print data created by application software, a change function of a paper type and the like, and so forth.

2. Description of the Related Art

A print preview function which temporarily displays an image to be printed on the display of a host computer before the image is actually printed on a paper sheet upon printing application data such as text, graphics, and the like created by application software or the like is known. The user can confirm the layout and the like of an image to be formed on a paper sheet by checking the image to be printed using this print preview function. An application program normally provides the print preview function. Note that an image to be displayed by the preview function will be referred to as a preview image and displaying a preview image will be referred to as previewing hereinafter.

A printer driver can also change a layout and the like since it has more advanced functions. Since the preview function provided by the application program cannot display a layout changed by the function of the printer driver, a function of previewing an image which reflects a layout change by the printer driver is demanded.

On the other hand, upon displaying and printing an image, colors to be expressed must not depend on devices. That is, a color indicated by a specific value on a given color system must be output as the same color by another device. Especially, the preview function is required to match the colors of an image to be printed with those of an image to be previewed. To meet such requirement, the latest operating system (OS) includes a color management function of matching the colors of an original image with those to be displayed on a display and that to be printed by a color printer. This function is also called a color matching function. As one of methods of implementing the color matching function, a method using files called color profiles, which define color attributes of respective devices is available. As a color matching technique using color profiles, a technique in which a printer driver and printer selectively use color profiles for a display and printer to match the display colors with the print colors of the printer has been proposed (see Japanese Patent Laid-Open No. 2003-244468).

In order to reflect the layout processing executed by the printer driver in a preview image, the printer driver must display the preview image. However, with this processing, the preview image is displayed in colors different from those to be printed.

This is because data used by the printer driver to display a preview image has undergone color matching processing for a printer device by the OS. That is, in order to print data, the application program calls a rendering function provided by the OS. Then, the OS outputs a rendering command that has undergone color matching for a printer to the printer driver. For this reason, when the printer driver displays a preview image using that rendering command intact, the preview image with normal colors cannot be displayed.

FIGS. 2A and 2B are views for explaining a preview image with a color that has undergone matching for a printer. A generally prevalent personal computer uses Windows® available from Microsoft Corporation as an OS, and the color of an original image is expressed on an RGB color system. FIGS. 2A and 2B show a rendering example of a text image "BLUE" with a color designated by (R=0, G=0, and B=255) from an application 101. FIG. 2A shows a state in which the application 101 displays a text image "BLUE" on a display 112 when the user creates data. FIG. 2B is a diagram for explaining the print processing to a printer 107 and the preview processing on the display 112. Note that data goes through a graphic device interface (GDI) 102 in the OS when the application 101 renders the data on the display 112 and when a printer graphics driver (the rendering function of the printer driver) 106 displays a preview image. However, in the following description, such processing will be omitted. The application 101 may execute color matching processing when it displays data on the display 112. However, in the following description, the application 101 does not execute matching. The GDI 102 is generally called a graphic engine or the like.

When the user observes data using the application 101, the application 101 renders a rendering instruction of a text image "BLUE" in a color corresponding to color information (R=0, G=0, B=255) on the display 112. The display result is an image 113. On the other hand, when the user prints data using the printer 107, the application 101 sends a rendering instruction to the printer 107 via the GDI 102. The color management function in the GDI 102 applies color matching to the color information R=0, G=0, B=255) included in the rendering instruction using a color profile 114 which saves color characteristics of the printer 107. As a result, the color information is converted into values (R=90, G=70, B=255) in the example shown in FIG. 2B. Then, the rendering instruction having color information (R=90, G=70, B=255) is output to the printer 107 via the printer graphics driver 106. The printer 107 executes print processing according to the received rendering instruction. The output color of a print result 110 by the printer 107 looks as the same color as the display color of a display result 113 since it has undergone correction (color matching) according to the color characteristics of the printer 107.

In order to display a preview image by the printer driver, the printer graphic driver 106 must execute preview processing. Input data to the printer driver has undergone color matching using the color profile 114 for the printer 107 by the color management function in the GDI 102. Hence, the color information has already been converted into values (R=90, G=70, B=255). Since this color information used to display a preview image, when a preview image 111 is displayed on the display 112, its color is different from the display result 113 by the application 101, and the preview image is displayed to have a color different from the original color.

To prevent this, the printer driver or printer itself executes color matching without using the GDI. However, the method of executing color matching in the printer driver or printer poses a problem that the rendering function of the OS that renders text and the like can no longer be used. This is because the rendering function of the OS works in collaboration with the color management function of the OS. That is, since there is no means for converting color information of the OS from outside the OS, even when the color matching function provided by the printer driver is used to convert colors, it cannot pass the converted color information to the OS. For this reason, if the rendering function of the OS is used, rendering is done using the color before conversion by the color matching function as an input color. In this manner, upon executing the color matching in the printer driver or printer, the rendering function of the OS cannot be used.

In order to display a preview image, rendering may be made using its own rendering function without using that of the OS. In this manner, color conversion for display may be applied to the rendering result to attain color matching for preview. However, in this case, upon making complicated rendering, the display result on the display may be different from the print result of the printer due to the specifications different from the rendering function of the OS. A new function added upon upgrading the OS version cannot be supported, and the print function may not normally work. Furthermore, high cost is required to develop a rendering engine.

Upon developing a unique color management function without using that of the OS, a problem of variations of colors output as a result of color matching is posed. For example, the color matching result may not often be satisfactory depending on the conversion method used by the uniquely developed color management function and its arithmetic precision. If devices selectively use the color management function of the OS and the unique one, colors to be originally output as the same colors may be output as different colors. Furthermore, a very large number of specifications of color profiles are available, and they may be changed. For this reason, it is difficult to maintain compatibility with the specifications of color profiles that may be used in terms of both cost and techniques.

The printer graphics driver 106 may convert a color signal which has already undergone matching for the printer into that for the display 112. However, since the processing is executed twice, it takes much time until a preview image is displayed. Upon executing the color matching processing between devices with different color gamuts, since a color which cannot be reproduced by a device after conversion must be replaced by another color (gamut mapping), originally different colors may be previewed as the same color.

SUMMARY OF THE INVENTION

The present invention has been made in consideration of the above prior arts, and has as its object to provide a print control program, print control apparatus, and print control method, which implement quick preview display that reflects processing applied to print data by a printer driver, and can attain high-quality preview display the display colors of which match print colors.

In order to achieve the above object, the present invention comprises the following arrangement. That is, a print control apparatus for displaying a print preview on a computer connected to a printer, comprises:

a spool unit adapted to spool print data created by application software;

a print processor unit adapted to issue a rendering instruction of the print data spooled by the spool unit to a graphic engine together with output information indicating one of a preview setting and a print setting;

a color profile determination unit adapted to return a response about one of a color profile for previewing when the output information indicates the preview setting and a color profile for printing when the output information indicates the print setting, as a response to an inquiry about a color profile from the graphic engine that receives the rendering instruction; and a printer driver unit adapted to display image data rendered by the graphic engine on a screen when the output information indicates the preview setting, and outputting the image data rendered by the graphic engine to the printer when the output information indicates the print setting.

A print control apparatus according to the present invention comprises:

a response unit adapted to return a response to an inquiry about a color profile for printing without returning any response to an inquiry about a color profile for previewing;

a preview unit adapted to, when the response unit does not return any response to the inquiry about the color profile for previewing, display a preview based on data which has undergone color matching using a color profile with a preview resolution, that is found by a search; and an output unit adapted to, when the response unit returns the response to the inquiry about the color profile for printing, output a printer command based on data which has undergone color matching using the color profile for printing.

A print control apparatus comprises:

a response unit adapted to return a response to an inquiry about a color profile for printing without returning any response to an inquiry about a color profile for previewing;

a preview unit adapted to, when the response unit does not return any response to the inquiry about the color profile for previewing, display a preview based on data which has undergone color matching using a default color profile of a system; and an output unit adapted to, when the response unit returns the response to the inquiry about the color profile for printing, output a printer command based on data which has undergone color matching using the color profile for printing.

According to the present invention, since both print processing and preview processing use the rendering function and color management function provided by the operating system, accurate color matching and high-speed processing can be achieved at the same time.

Further features of the present invention will become apparent from the following description of exemplary embodiments with reference to the attached drawings.

BRIEF DESCRIPTION OF THE DRAWINGS

FIG. 4 shows a DEVMODE data structure;

FIG. 7 is a flowchart showing the sequence for printing spooled data in the first embodiment;

FIGS. 9A and 9B are flowcharts showing the sequence for previewing spooled data in the second embodiment;

FIG. 11 is a flowchart showing the sequence for determining a color profile by a GDI 102.

DESCRIPTION OF THE EMBODIMENTS

Overview

Figure 1:
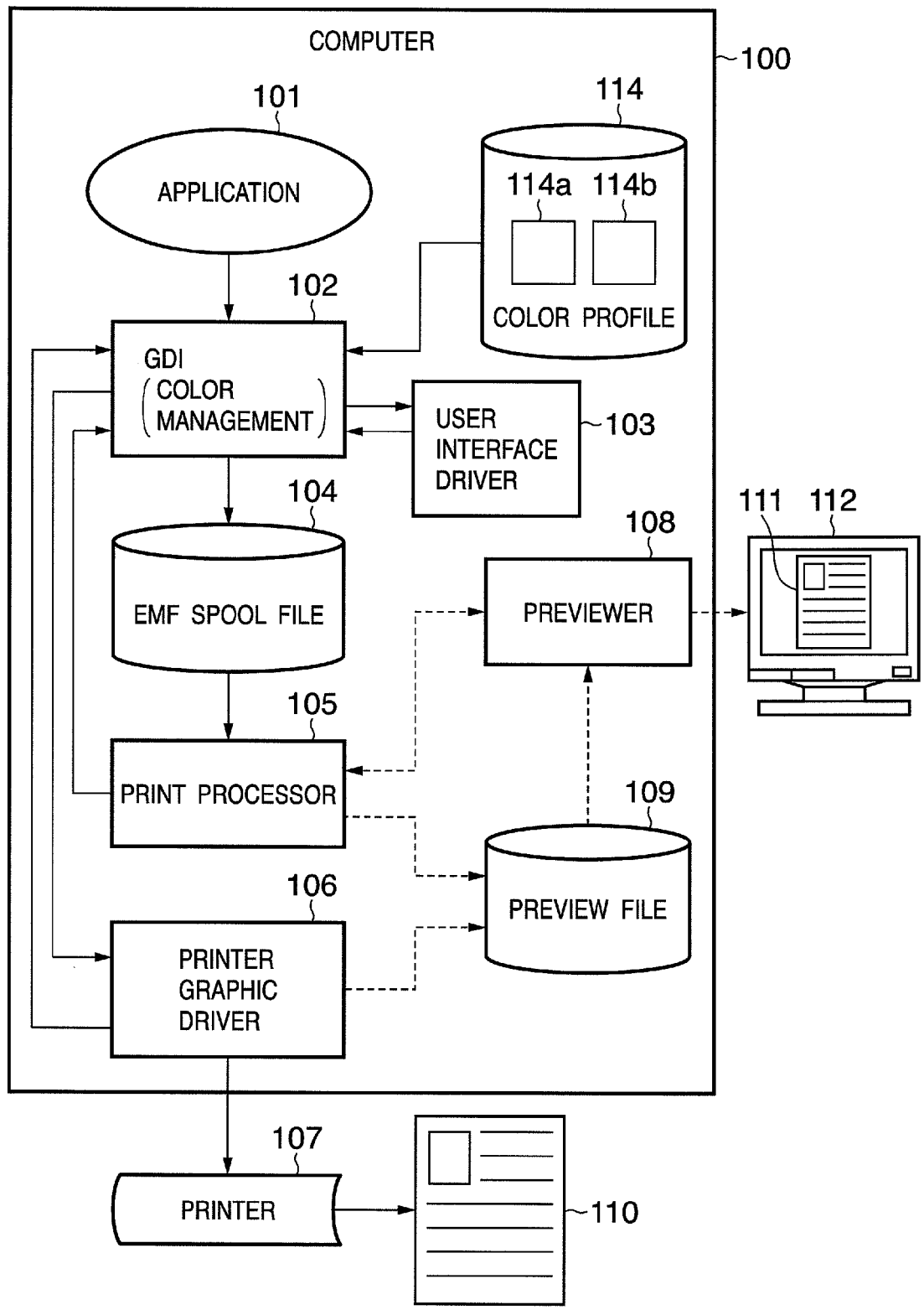
FIG. 1 is a block diagram showing the arrangement of a printing system according to one embodiment of the present invention.
Figure 2A:
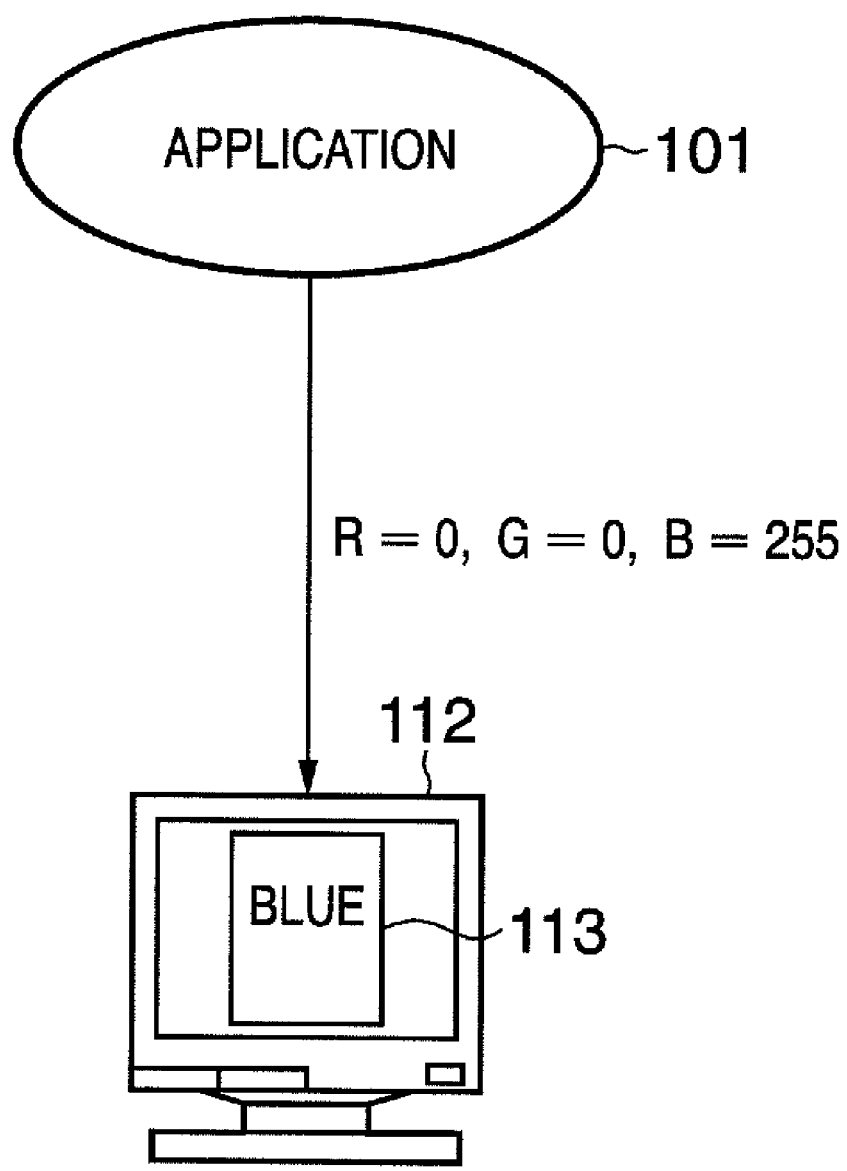
FIGS. 2A and 2B are views for explaining a preview image with a color that has undergone matching for a printer.
Figure 2B:
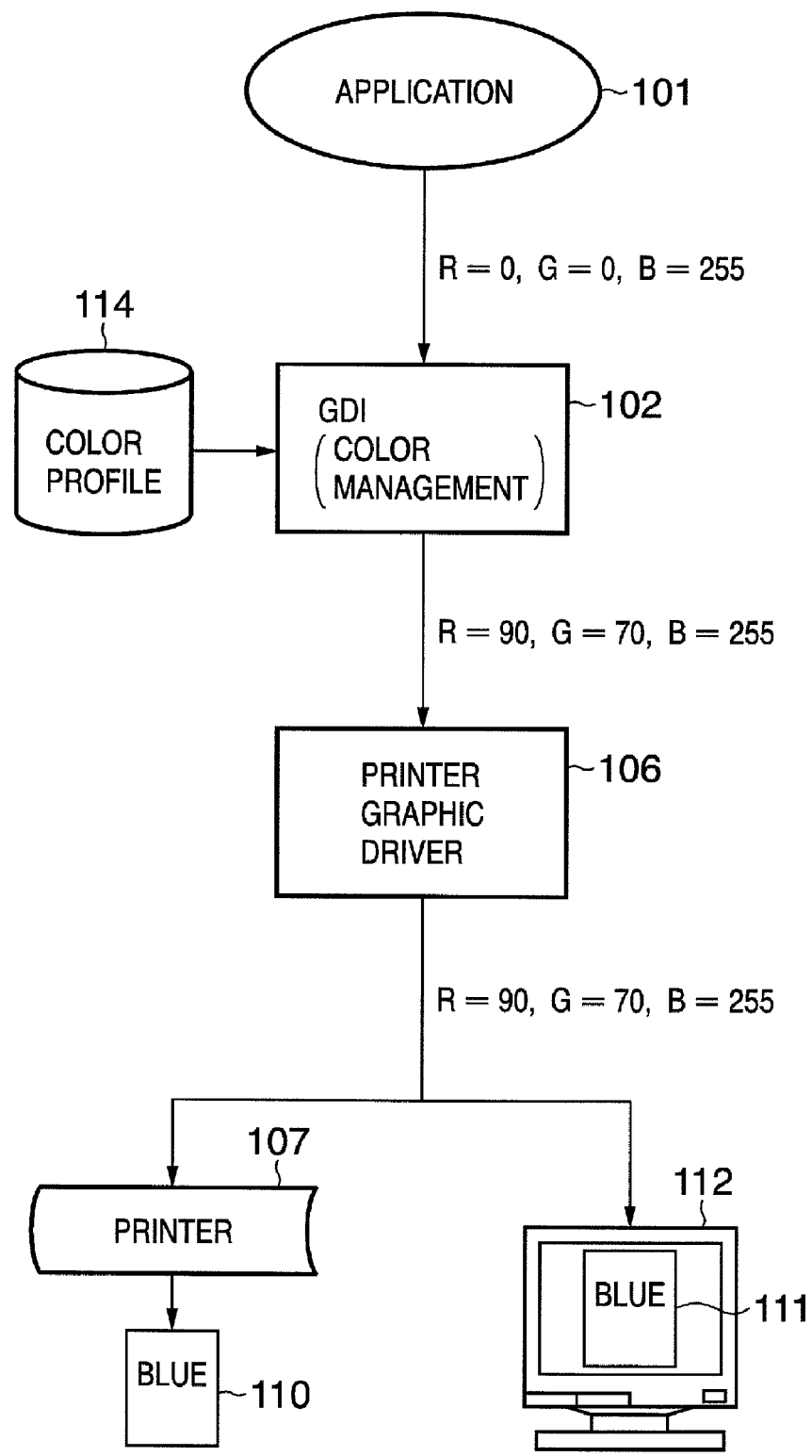

FIG. 1 is a software block diagram of the present invention. In this embodiment, a computer 100 is installed with Windows® of Microsoft Corporation as an operating system. Also, the computer 100 is installed with an application program (to be referred to as an application hereinafter) 101 having a print function. The computer 100 is connected to a display 112 and printer 107 to form a printing system. The printer 107 may be locally connected to the computer or may be shared via a network or the like.

The application 101 is a document processing program or the like which generates data to be printed or displayed and has a print function of generated data. A GDI 102 is a software module which provides an input/output function in the Windows® operating system of Microsoft Corporation. The GDI 102 generates a rendering instruction according to a called function and parameters, and stores it in an EMF spool file 104. The GDI 102 can execute color matching processing using a color profile 114 in accordance with an instruction. A color management function provided by Windows® is called ICM. Note that the color profile 114 includes a source color profile (not shown) and device color profiles. As the device color profile, a plurality of profiles are prepared in correspondence with devices. In this embodiment, a color profile 114a for the display and a color profile 114b for the printer are prepared. A print processor 105 reads out the spooled rendering instruction from the spool file 104, and passes it to a printer graphic driver 106 and previewer 108. In this embodiment, the print processor 105 is not included in the OS, and is provided by the vendor of the printer 107 together with the printer graphic driver 106. The printer graphic driver 106 is a program module which executes specific processing for the printer 107. Upon reception of the rendering instruction, the printer graphic driver 106 executes processing for converting the rendering instruction into a format that the printer 107 can interpret, and so forth. The printer graphic driver 106 generates a preview file 109 used to make preview display by the previewer 108. The previewer 108 makes preview display based on the preview file 109 in accordance with an instruction from the print processor 105.

Note that the computer 100 is a normal, general-purpose computer, has resources such as a CPU, memory, disk device, and the like, and implements functions by the operating system, application, printer graphic driver, and the like when the CPU executes programs. The sequences of the flowcharts shown in FIG. 5 and subsequent figures are implemented when the CPU executes programs.

First Embodiment

In this embodiment, upon printing or previewing data created by the application 101 by the printer driver, the GDI 102 executes color matching processing. In order to output both the print result 110 and preview result 111 to have normal colors, preview data to the display 112 and print data to the printer 107 must undergo color matching processing, respectively. Upon previewing and printing, the color matching processing is executed twice via the GDI 102 having the color management function using the suited color profiles 114a and 114b. The first embodiment of the present invention will be described hereinafter with reference to the accompanying drawings.

In the printing system shown in FIG. 1, the application 101 sends data to be printed to the GDI 102. Normally, the GDI 102 temporarily spools the data received from the application 101 in the EMF spool file 104 as EMF (Enhanced Meta File) data, and issues a print request to the print processor 105 upon completion of spooling.

Upon reception of the print request from the GDI 102, the print processor 105 launches the previewer 108 as a program used to preview data. The print processor 105 requests the printer graphic driver (printer driver rendering function) 106 to generate the preview file 109 via the GDI 102. The GDI 102 sends an inquiry about a color profile to a user interface driver (a UI function of the printer driver) 103. The GDI 102 then executes color matching using a color profile according to an ID (also called a name) as a response. For this reason, since the user interface driver 103 switches the color profile, the GDI 102 can execute color matching using the color profile 114a for the display 112.

The GDI 102 loads a rendering instruction from the EMF spool file 104, applies color matching processing for the display 112 to the rendering instruction, and then sends an output request to the printer graphic driver 106. The printer graphic driver 106 renders data, corresponding to the output request from the GDI 102 to bitmap data for a preview, and stores the bitmap data in the preview file 109, thus ending the processing. Conventionally, upon starting printing after the preview, the printer graphic driver 106 need only convert a rendering instruction into a command for the printer 107, and output the command to the printer 107. However, in this embodiment, since the rendering instruction is output via the GDI 102 again, the process temporarily returns to the print processor 105 to apply the color matching processing for the printer 107 by the GDI 102.

Upon reception of the rendering end message from the printer graphic driver 106, the print processor 105 requests the previewer 108 to start previewing. The previewer 108 loads the preview file 109, and displays it on the display 112 as a preview result 111.

After that, upon reception of a print instruction from the user via the previewer 108, the print processor 105 instructs the printer graphic driver 106 via the GDI 102 to execute the print processing of the EMF spool file 104. In this case, if the user designates color matching, the GDI 102 inquires the user interface driver 103 of a color profile. Since the user interface driver 103 returns the name of the color profile 114 for the printer 107, the GDI 102 executes color matching using the color profile with the returned ID.

The GDI 102 loads rendering instructions from the EMF spool file, executes color matching for the printer 107, and then sends an output request to the printer graphic driver 106. The printer graphic driver 106 converts the output request into a command that the printer 107 can interpret, and outputs the command to the printer 107. The printer 107 prints data based on the command as the print result 110.

Note that the application 101 is an application program such as a document processing program or the like. The OS provides a function of spooling data in the EMF spool file 104 by the GDI 102, the color management function, the rendering function, and default color profiles of the system. The printer vendor provides the user interface driver 103, print processor 105, printer graphic driver 106, previewer 108, and color profile 114b for the printer as a printer driver program. The vendor of the display 112 provides the color profile 114a for the display 112.

Figure 5:
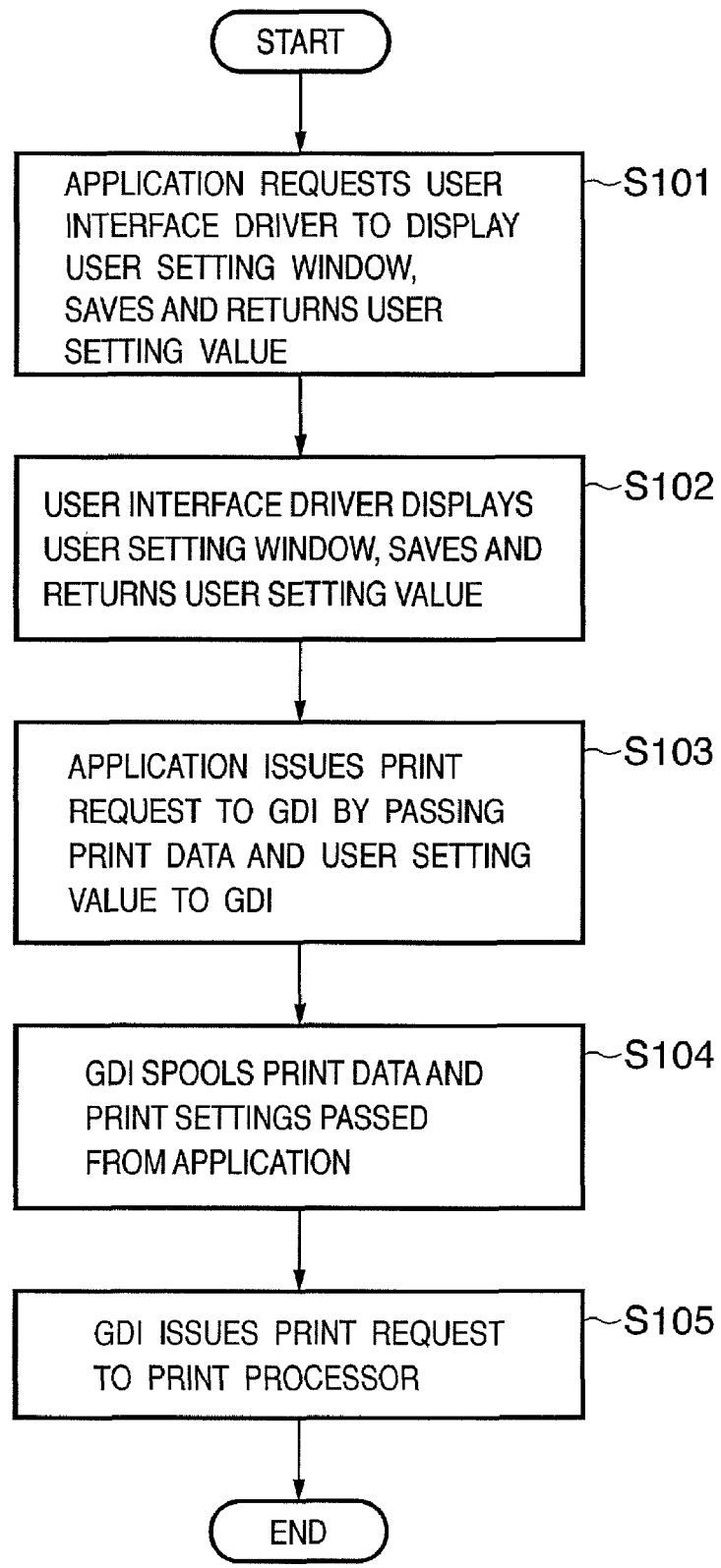
FIG. 5 is a flowchart showing the spool sequence when an application requests to print.
Figure 6A:
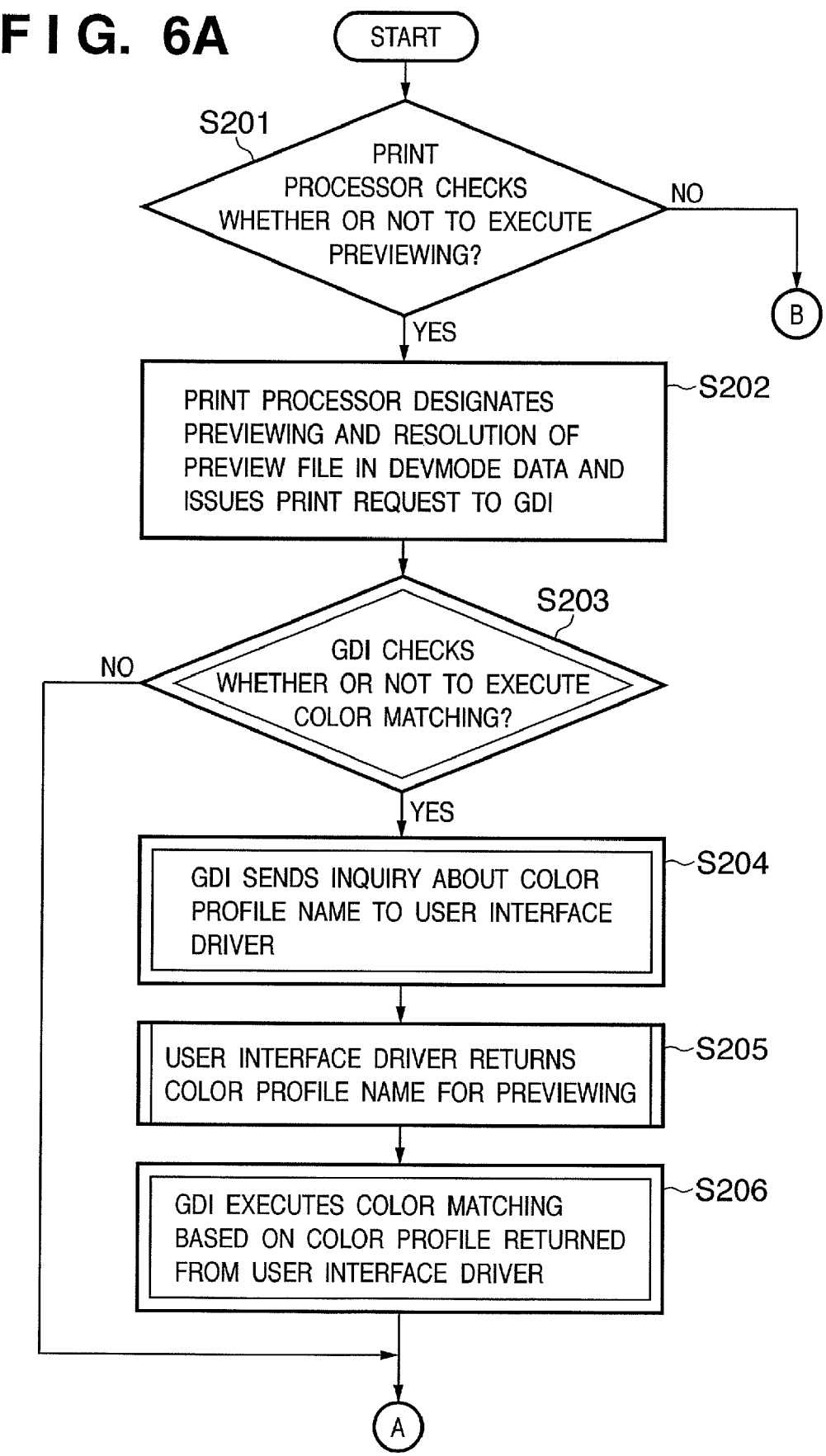
FIGS. 6R and 6B are flowcharts showing the sequence for previewing spooled data in the first embodiment.
Figure 6B:
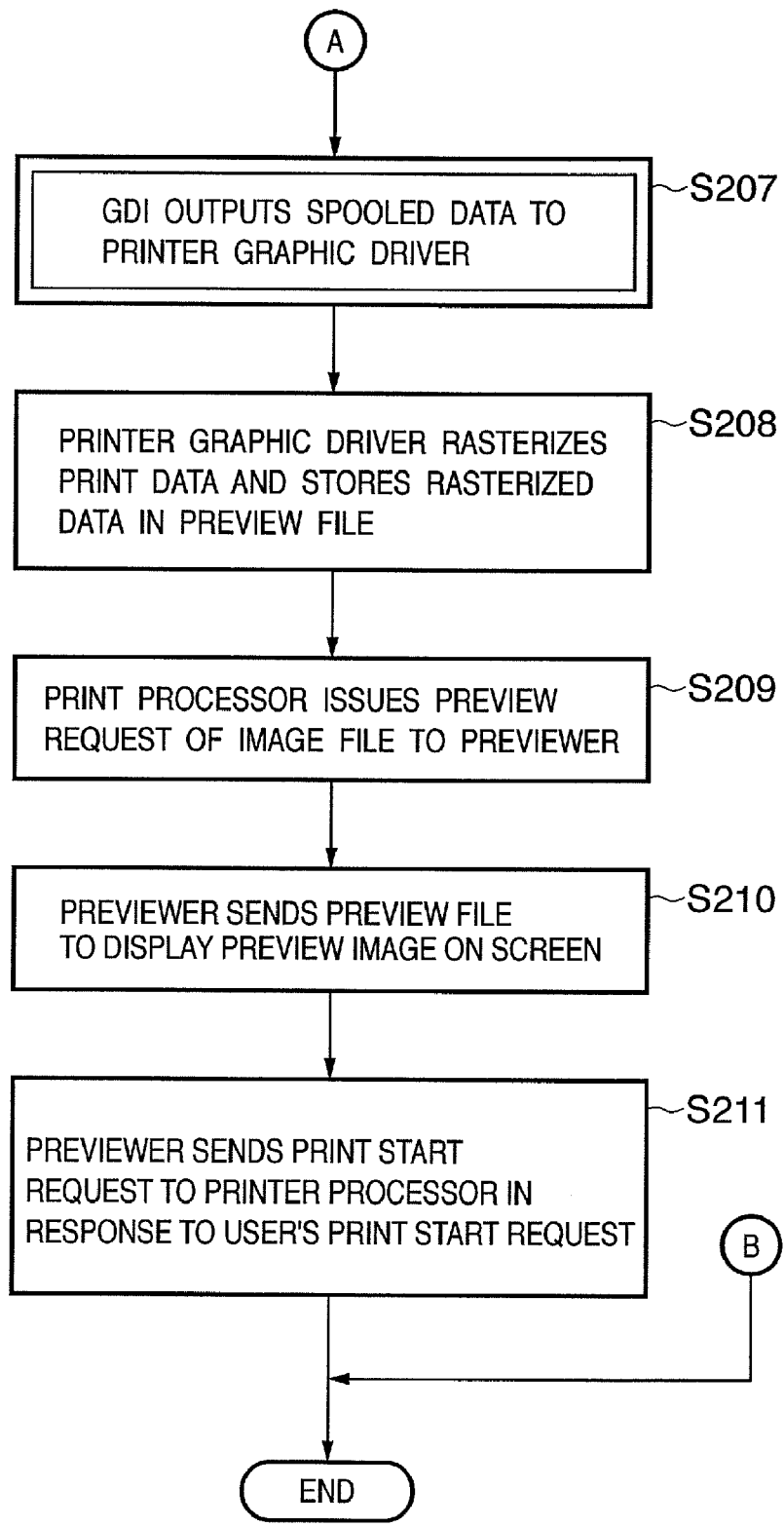
Figure 8:
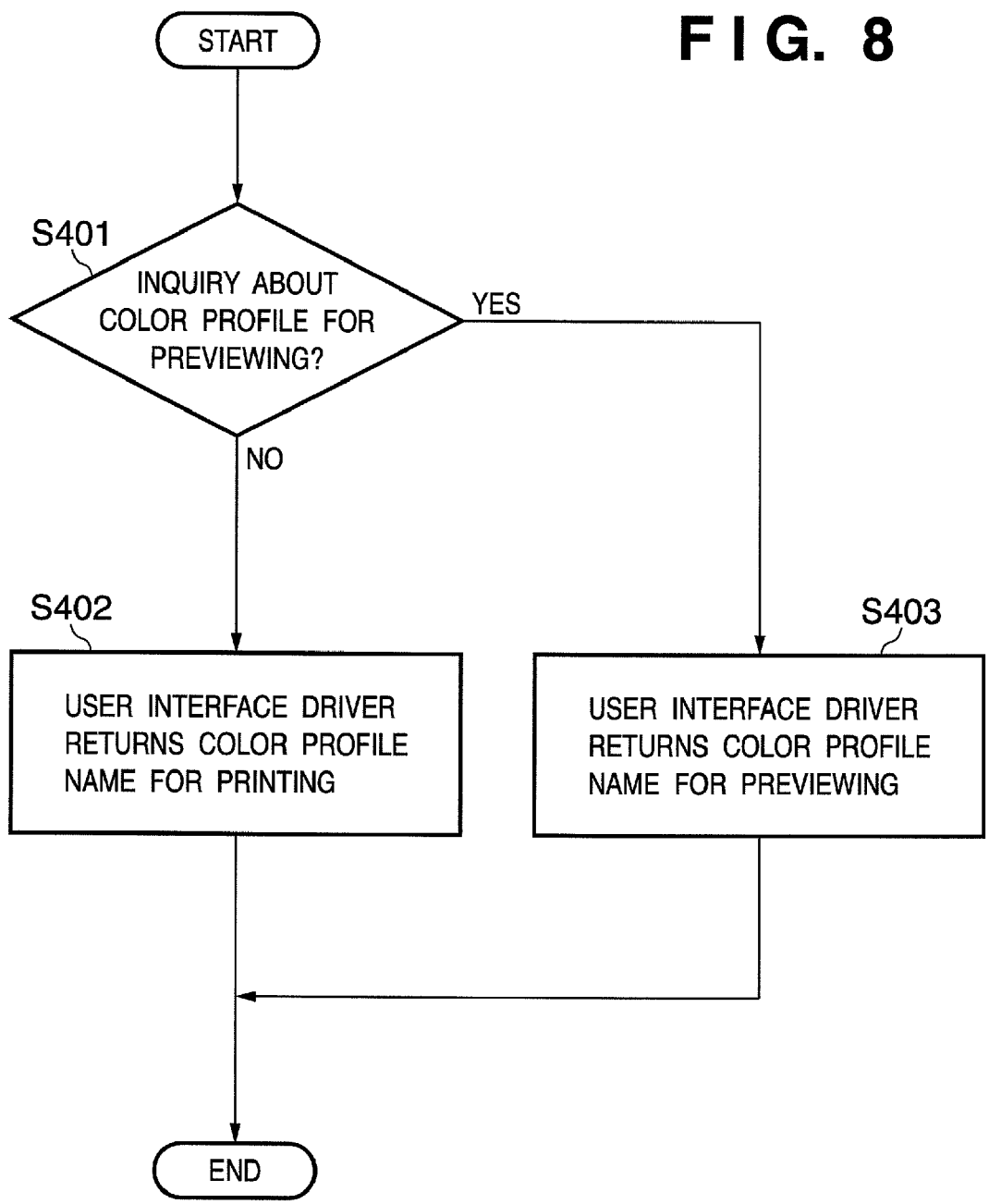
FIG. 8 is a flowchart for selecting a color profile 114.

The processing according to the embodiment of the present invention will be described below with reference to the flowcharts shown in FIGS. 5 to 8. FIG. 5 is a flowchart showing the spool sequence when the application requests, FIGS. 6A and 6B are flowcharts showing the sequence for previewing the spooled data, FIG. 7 is a flowchart showing the sequence for printing the spooled data, and FIG. 8 is a flowchart for selecting a color profile 114.

<Spooling of Application Data>

The spool processing when the application 101 requests to print will be described below with reference to FIG. 5. Note that the computer 100 executes the processing in FIG. 5, but blocks serving as execution main bodies differ for respective steps. Upon printing data, the application 101 requests the user interface driver 103 to display a user setting window and to send its setting result via the GDI 102 so as to set the printer 107 (step S101).

Figure 3:
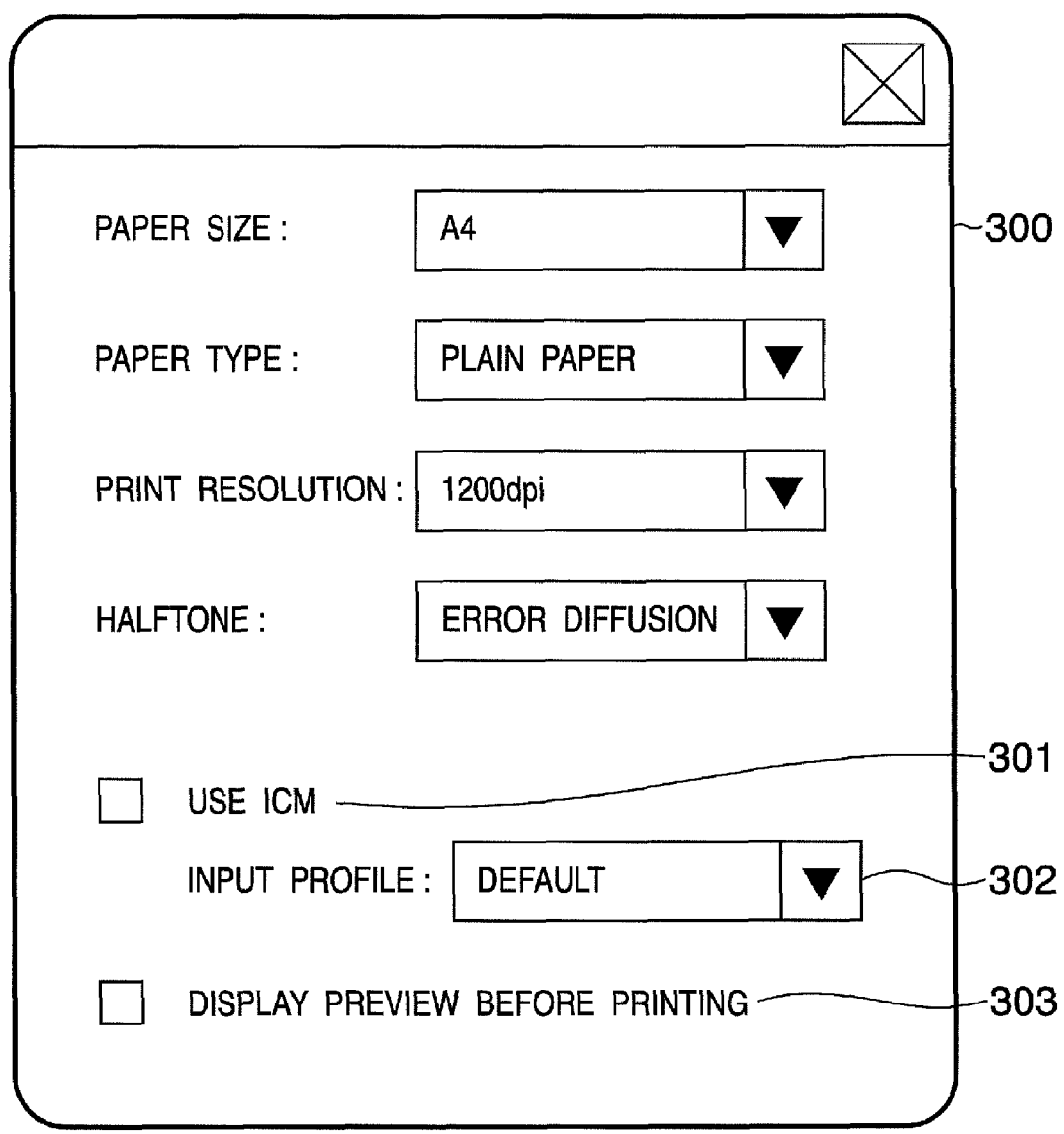
FIG. 3 shows an example of a user setting window.

The user interface driver 103 displays the user setting window. FIG. 3 shows an example of the user setting window. In this example, a user setting window 300 allows the user to select a paper type such as plain paper, photo paper, and the like, the print resolution that influences print quality, and a pseudo halftone processing method, in addition to the paper size. In addition, the user setting window includes a check box 301 used to designate execution of the ICM as the color matching function, and a selection box 302 of a color profile of original data upon execution of the color matching. Furthermore, the user setting window includes a check box 303 used to set whether or not to execute preview processing. The user can input desired settings from the user interface window shown in FIG. 3.

The user interface driver 103 stores these setting results set by the user in DEVMODE whose data structure is specified by Windows®. This DEVMODE is stored in a memory, hard disk device, or the like of the computer. Since the DEVMODE is passed from the application 101, the user interface driver 103 saves the setting results, and returns them to the application 101 via the CDI 102 (step S102).

FIG. 4 shows an example of the DEVMODE data structure. As shown in FIG. 4, various print setting parameters are stored in DEVMODE. For example, the paper size is stored in a "dmPaperSize" field 401, the paper type is stored in a "dmMediaType" field 402, and the halftone method is stored in a "dmDitherType" field 403 as values. Of these items, since general items are defined by Windows®, these values are used, and other special items can use values assigned to specific fields by each printer driver. The print resolution is stored in a "dmPrintQuality" field 404 as a DPI (Dot Per Inch) value. As a parameter about whether or not to execute the ICM, one of values defined like (1) to (4) below is stored as color management information.

(1) DMICMMETHOD_NONE: not execute ICM processing;

(2) DMICMMETHOD_SYSTEM: execute ICM processing in OS;

(3) DMICMMETHOD_DRIVER: execute ICM processing in printer driver; or (4) DMICMMETHOD_DEVICE: executes ICM processing in printer.

In this embodiment, one of (1) and (2) is set according to the value of the check box 301 on the user interface window 300 in FIG. 3 so as to implement color management using the color management function of the OS. That is, if the user checks the check box 301, the user interface driver 103 sets and stores "DMICMMETHOD_SYSTEM" in a "dmICMMethod" field 405; otherwise, it sets and stores "DMICMMETHOD_NONE" in it.

In this embodiment, if the user selects (2) "execute ICM processing in OS" as the color management method, an image can be normally previewed by executing the processing in the sequences shown in FIG. 5 and subsequent figures. Note that the OS does not define settings about a profile to be used and information as to whether or not to execute preview processing. Hence, the printer driver uniquely adds data to a device-unique field "dmDriverData" and subsequent fields to store these settings. In the example of FIG. 4, the color profile ID is stored in a "dmxxxxx" field 406 as color profile information, and preview information as to whether or not to execute preview processing is stored in a "dmyyyyy" field 407. In this manner, the setting values input from the user interface are stored in the DEVMODE.

The application 101 passes print data, and the print settings stored in the DEVMODE returned in step S102 to the GDI 102 to issue a print request (step S103). These data can be passed via, e.g., addresses.

The GDI 102 spools the print data passed from the application 101 together with the print settings in the EMF spool file 104 as a standard spool file format of Windows® (step S104)

Upon completion of spooling, the GDI 102 requests the print processor 105 to start printing (step S105).

<Preview Processing>

The processing for previewing spooled data will be described below using FIGS. 6A and 6B. In FIGS. 6A and GB, steps S203, S204, S206, and S207 are processes by the Windows® operating system as the GDI and are indicated by double frames.

Upon reception of the print start request in step S105, the print processor 105 checks whether or not to preview the print data requested from the CDI 102. Whether or not to preview the print data is determined based on the DEVMODE data received in step S102 (step S201). The print processor 105 refers to the preview information 407 set using the check box 303 on the user setting window 300, and if the value indicating that the preview processing is to be executed is stored, the process branches to step S202. If the user does not select the preview processing on the user setting window, and it is determined that the preview processing is not required, the print processor 105 ends the processing in FIGS. 6A and 6B and starts the next print processing. Note that the preview information 407 is available in the field uniquely stored by the printer driver, but the print processor 105 can refer to the unique field since it is prepared and provided together with the printer driver.

If it is determined in step S201 that the preview processing is required, the print processor 105 writes a setting (preview designation) corresponding to rendering for the preview processing in the DEVMODE. The print processor 105 may create a new data field in the DEVMODE and may store the preview designation in that field. However, in this case, the processor 105 writes the preview designation in the resolution field. Normally, since the resolution of the display 112 is lower than that of the printer 107, rendering for the preview processing can be processed at a lower resolution and a higher speed. Hence, upon previewing a low resolution for the preview processing is set. In addition, since the resolution level can be set as a negative value, the resolution upon previewing can be set at a level different from that upon printing. As will be described later, note that this embodiment uses the resolution field as output information used by the GDI 102 to identify whether the output instruction from the print processor 105 is that for previewing or printing.

The print processor 105 then sends a print request to the GDI 102 based on the DEVMODE that stores the preview settings (step S202).

Upon reception of the print request, the GDI 102 checks if color matching is to be executed in the OS. The GDI 102 makes this decision by checking if the value of a "dmICMMethod" field 405 of the DEVMODE is "DMICMMETHOD_SYSTEM". If it is determined that color matching need not be executed, the process branches to step S207 (step S203).

If it is determined in step S203 that color matching is to be executed, the GDI 102 sends an inquiry about the color profile ID to the user interface driver 103 (step S204). The inquiry uses a function DrvQueryColorProfile( ). The GDI 102 designates the file name of the source color profile that represents the color attribute (color system) upon creating the original data by the full path (with folder information indicating where the source color profile is stored), and designates the file name of the device color profile that represents the color attribute (color system) of the device as the output destination by the full path (with folder information indicating where the device color profile is installed).

Upon reception of the inquiry about the color profile ID, the user interface driver 103 sets the selection result of the color profile for the original data stored in the DEVMODE in step S102 in response to the inquiry about the source color profile. On the other hand, the user interface driver 103 returns the ID of the color profile 114a for previewing or the color profile 114b for printing depending on whether the inquiry about the color profile is an inquiry about that for previewing or printing in response to the inquiry about the device color profile. In this case, the user interface driver 103 returns the ID of the color profile 114a for previewing (step S205) Note that the CDI 102 can pass designation about whether the color profile to be inquired is the source or device profile and that for previewing or printing using, e.g., the DEVMODE values. More specifically, whether the color profile to be inquired is the source or device profile is designated by an argument (ID) of "DrvQueryColorProfile".

FIG. 8 shows the processing sequence of the user interface driver 103 upon reception of the inquiry. More specifically, the user interface driver 103 checks based on the resolution set in the DEVMODE if the inquiry about the name of the color profile 114 is that for previewing (step S401). The resolution of the device is determined for each device, the resolution of the display is lower than that of the printer, and the two resolutions never become the same. Hence, if the resolution set in the DEVMODE matches that of the printer, the user interface driver 103 can determine that the inquiry about the color profile name is not that for previewing. Also, the user interface driver 103 may compare the resolution with a reference value in this checking processing. Since the resolution level can be set as a negative value, the resolution upon previewing can be set at a level different from that upon printing. Of course, an independent parameter indicating whether or not the color profile is that for previewing may be assured, and whether or not the color profile is that for previewing may be designated by passing that parameter.

In this case, since the print processor 105 sets the resolution for previewing in step S202, the user interface driver 103 returns the name (ID) of the color profile for previewing (S403). As the color profile for previewing, the color profile 114a for previewing on the display 112 which is used is preferably used. The supply source of the display 112 normally distributes this color profile 114a for the display 112 together with the display 112, but the user may register a color profile created by himself or herself. Also, a color profile "sRGB Color Space Profile.icm" which represents a color space that is most generally used by the display 112 and is included in the Windows® OS may be used. If it is determined that the color profile is not that for previewing, the user interface driver 103 returns the ID of that for printing, i.e., the color profile 114b for the printer to the GDI 102 (S402).

Referring back to FIGS. 6A and 6B, the GDI 102 executes color matching using the color profile with the ID returned from the user interface driver 103 in step S205 (step S206). The GDI 102 sends a print request with the print data that has undergone the color matching to the printer graphic driver 106 (step S207).

Upon reception of the print request, the printer graphic driver 106 renders the print data passed from the GDI 102 to bitmap data. At this time, the printer graphic driver 106 renders the print data by reflecting the print settings unique to the printer driver. The print settings unique to the printer driver include a layout and the like input by the user interface provided by the user interface driver 103. The print settings unique to the printer driver are saved in, e.g., the field unique to the device of the DEVMODE. The print settings unique to the printer driver include a so-called N-in-1 layout setting which lays out N pages on one sheet in a reduced scale, and the like. Note that the print processor may designate the N-in-1 processing and the like in place of the printer graphic driver 106 when it sends a print request to the GDI in step S202 and the like. That is, at this time, the GDI sends an output request of data for one page after the N-in-1 processing as rendering data for one page to the printer graphic driver 106.

The rendering processing in this case uses the rendering function provided by the GDI 102. For this reason, the GDI 102 executes the rendering processing using the color information that has undergone the color matching processing for the display. In this case, the printer graphic driver 106 rasterizes the print data for previewing, and stores the rasterized image (i.e., bitmap data) in the preview file 109 (S208). Since the print processor 105 sets the resolution for previewing in the DEVMODE in step S202, the printer graphic driver 106 can determine in step S208 based on that resolution that the rendering is that for previewing in the same manner as in step S401. The data format of the preview file 109 is not particularly limited as long as the previewer 108 can process it. For example, the preview file 109 may be multi-valued data before halftone processing or binary data after the halftone processing. Since this preview file 109 stores an image obtained by converting the print data that has undergone color matching using the color profile 114a for the display 112, the preview image can be displayed with original colors.

However, since the print data (including the rendering instruction and parameters) corresponding to the output request in step S207 has undergone color matching for the display 112, if this print data is rendered and is output to the printer 107, an image is printed to have colors converted for display. For this reason, the color tone of the image becomes unnatural, and does not match that of the preview image. Hence, upon completion of rendering for the print data for previewing for one page, the printer graphic driver 106 temporarily ends the processing, and returns the process to the print processor 105.

After the preview file 109 is generated and the process returns from the printer graphic driver 106, the print processor 105 notifies the previewer 108 of the end of generation of the preview file 109, and sends a preview request to the previewer 108 (step S209). In response to this request, the previewer 108 sends the preview file 109 generated in step S208 to the display 112 to display a preview image (step S210).

After that, the previewer 108 waits for an instruction from the user such as pressing of a print start button, which is displayed on the preview window together with the preview image, or the like. Upon reception of the print start instruction from the user, the previewer 108 ends the preview processing in response to that print start request, and sends a print start request to the print processor 105 (step S211).

<Print Processing>

The processing for printing spooled data will be described below. Upon printing the spooled data, as shown in FIG. 7, the print processor 105 requests the printer graphic driver 106 to output print data to the printer 107. In this case, the print processor 105 sets a print designation indicating rendering for printing in the DEVMODE. The print processor 105 makes the print designation by setting the resolution for printing in the resolution field of the DEVMODE as in the preview designation. Since the resolution for printing is determined for each printer model, a value according to the printer used in printing is set. The print processor 105 issues a print request to the GDI 102 based on the print-designated DEVMODE (step S301).

Upon reception of the output request, the GDI 102 checks if color matching is required by seeing if the "dmICM-Method" value of the DEVMODE is "DMICMMETHOD_SYSTEM", as in step S203 (S302). If it is determined that color matching is not required, the GDI executes the processes in step S306 and subsequent steps.

If it is determined in step S302 that color matching is executed in the OS, the GDI 102 sends an inquiry about the color profile ID to the user interface driver 103 (step S303).

The user interface driver 103 returns the ID of the color profile for the original data stored in the DEVMODE in response to the inquiry about the source color profile as in step S205.

On the other hand, the user interface driver 103 returns the color profile for printing or previewing in response to the inquiry about the device color profile. In this case, the driver 103 returns the ID of the color profile 114b for printing since the resolution for printing is set in the DEVMODE (step S304).

FIG. 8 shows the processing sequence of the user interface driver 103 upon reception of the inquiry. More specifically, the user interface driver 103 checks based on the resolution in the DEVMODE if the inquiry about the color profile ID is that for previewing (step S401). In this case, since the print processor 105 sets the resolution for printing in step S301, the user interface driver 103 returns the name (ID) of the color profile 114b for printing (S402).

Referring back to FIG. 7, the GDI 102 executes color matching using the color profile with the ID returned from the user interface driver 103 in step S304 (step S305). Next, the GDI 102 requests the printer graphic driver 106 to output the print data that has undergone color matching (step S306).

Upon reception of the output request, the printer graphic driver 106 rasterizes the print data of the EMF spool file passed from the GDI 102 to generate bitmap data (step S307). At this time, the printer graphic driver 106 reflects print settings unique to the printer driver. The rendering processing in this case uses the rendering function provided by the GDI 102. For this reason, the GDI 102 executes the rendering processing using the color information that has undergone the color matching processing for the printer.

The printer graphic driver 106 converts the rendered bitmap data into a printer command, and sends the printer command to the printer 107 (step S308).

The print result 110 obtained by outputting and printing the printer command by the printer 107 is printed to have normal colors which have undergone correct color matching in accordance with the color characteristics of the printer device, since image data after matching using the color profile 114b for the printer 107 is output. In this way, this processing ends.

As described above, according to this embodiment, the print processor 105 selectively sends an output request of print data for previewing or printing to the GDI 102. In each request, the print processor 105 switches the print setting value to be set in the DEVMODE, which indicates if the request is that for previewing or printing, and passes the print setting value to the GDI. In this way, since the user interface driver 103 passes the designated one of the color profiles for previewing and printing to the GDI 102, the GDI 102 can execute color matching suited to the output destination device.

In this way, a preview image can be normally displayed on the display at high speed while using the rendering function and color management function on the OS. For this reason, the preview image and print image match as well as the print settings unique to the printer driver. Also, expressed colors can be matched.

In this embodiment, the print processor 105 launches the previewer 108, and issues a preview start request. Alternatively, the user interface driver 103 may launch the previewer 108, or the printer graphic driver 106 may launch the previewer 108 and may issue a preview start request.

Second Embodiment

The first embodiment is implemented by returning the name of the color profile 114 by the user interface driver 103. However, this embodiment describes a method that does not return any color profile 114.

FIG. 11 is a flowchart showing the sequence for determining the color profile 114 used in color matching by the GDI 102. The GDI 102 determines one of the source color profile 114a and device color profile 114b as that used in color matching. In this case, the GDI 102 executes the following processing.

The GDI 102 sends an inquiry about the color profile ID using a DrvQueryColorProfile command to the user interface driver 103 first. Note that the user interface driver 103 does not return the ID of the color profile in some cases, i.e., when it returns an error in response to DrvQueryColorProfile or it does not prepare a DrvQueryColorProfile function itself. This is because the color profile ID must be determined before shipping of the user interface driver 103 so as to return the color profile ID, and if the color profile is switched to that created by the user, the ID cannot often be acquired.

For this reason, the GDI 102 checks if the user interface driver 103 can acquire the normal color profile ID (step S701). Since the GDI does not often support DrvQueryColorProfile depending on the OS version, it is also determined that the user interface driver 103 cannot acquire the normal color profile ID.

If it is determined in step S701 that the user interface driver 103 can normally acquire the color profile 114, the GDI 102 determines use of the acquired color profile 114 (step S702).

On the other hand, if it is determined in step S701 that the user interface driver 103 cannot acquire any color profile, the GDI 102 searches color profiles associated with the target printer 107 for the most suited color profile 114. Association is to determine the correspondence between the installed color profiles and devices that use the color profiles. The user can associate the color profiles with the devices using the function of the OS. However, in most cases, association is automatically done when the color profile 114 provided as a part of the printer driver is installed together with the printer driver.

Normally, the color profile 114 differs depending on the printer resolution, paper type, and halftone method. For this reason, the color profile 114 can describe the values of the resolution, paper type, and halftone method. The GDI 102 selects a color profile 114 whose values match those of the DEVMODE that stores user setting values, and returns its ID to the GDI. Hence, the GDI 102 searches the associated color profiles for a color profile which has the aforementioned setting item values that match the values of the corresponding items in the DEVMODE. Then, the GDI 102 checks if a corresponding color profile is available (step S703).

If a color profile 114 whose values matches those of the DEVMODE is found, the GDI 102 determines that this color profile 114 as the device color profile 114 (step S704). Note that the GDI 102 does not search for a source color profile by this method.

If it is determined in step S703 that the color profile 114 whose values matches those of the DEVMODE is not available, and if the GDI 102 searches for the source color profile 114, the GDI 102 determines use of a default color profile of the system (step S705). The GDI 102 selects the color profile to be used in the aforementioned sequence.

This embodiment will explain a method that the GDI 102 uses the color profile 114 selected from those which are associated with each other, following the procedure in FIG. 11 described above. A description of the same processes as those in the first embodiment will be omitted, and only different processes will be explained. Note that the source color profile 114 is changed by the same method as in the first embodiment.

Figure 9B:
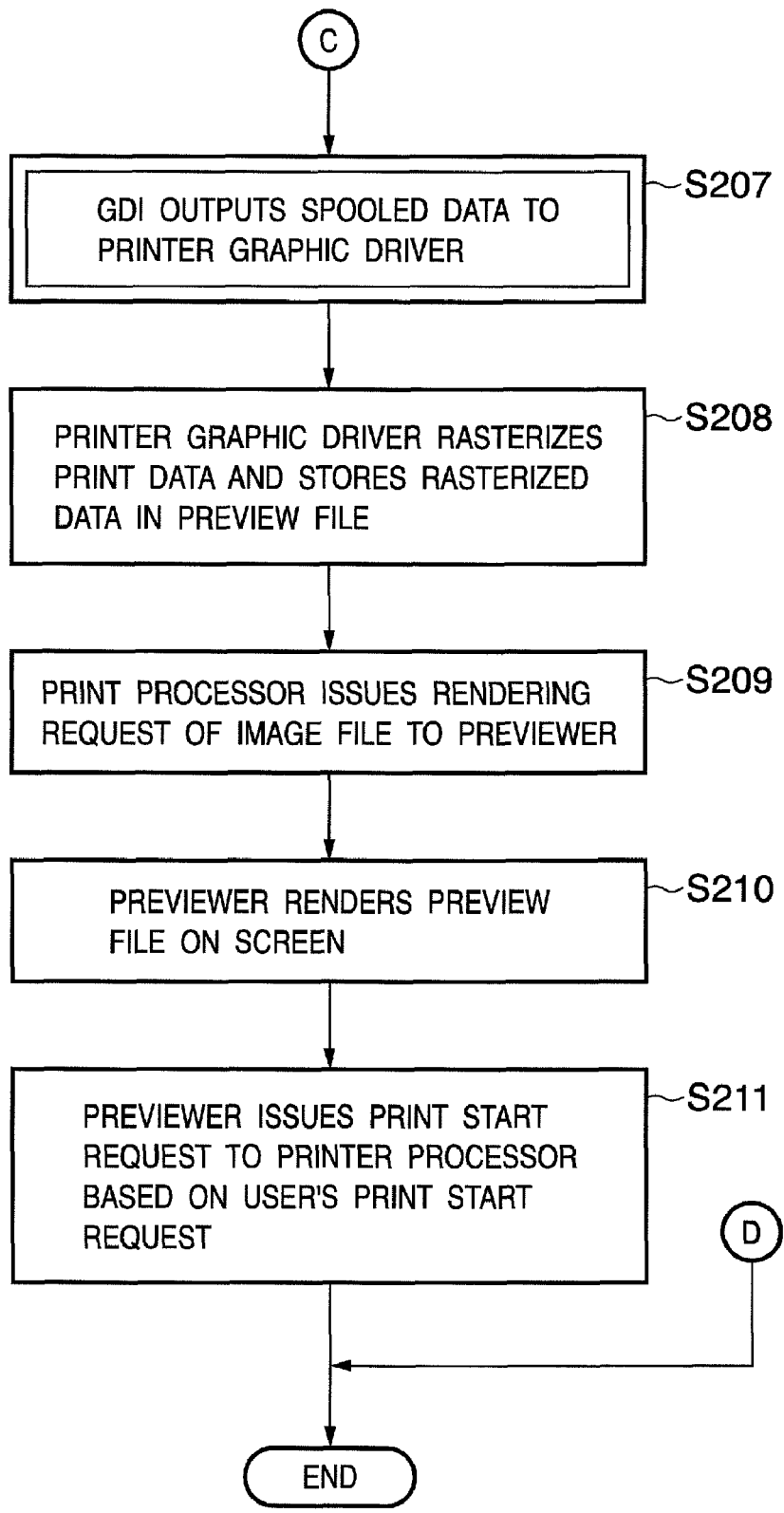
Figure 10:
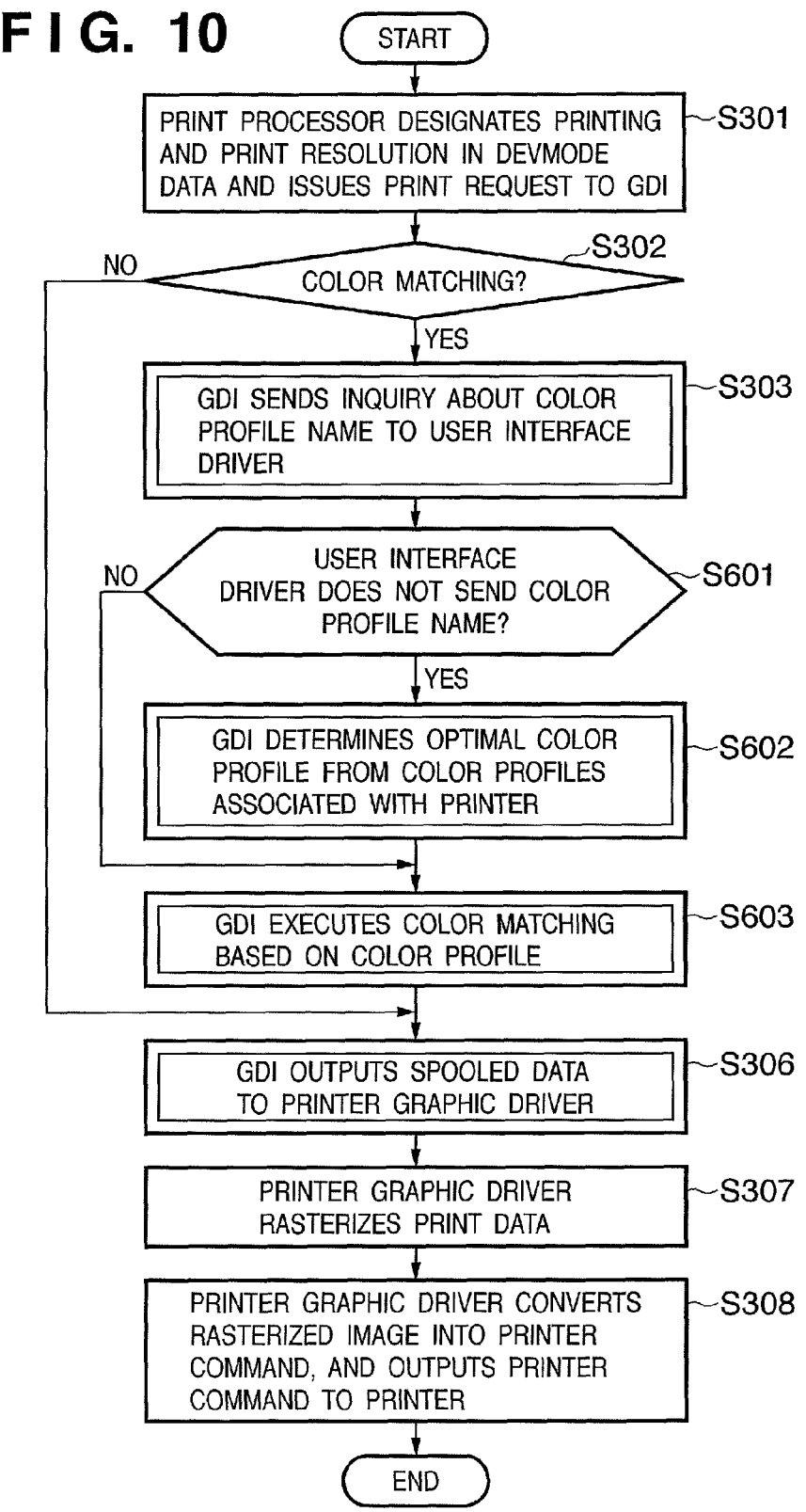
FIG. 10 is a flowchart showing the sequence for printing spooled data in the second embodiment.

FIGS. 9A and 9B are flowcharts showing the sequence for previewing spooled data in this embodiment, and FIG. 10 is a flowchart showing the sequence for printing spooled data.

In FIG. 9A, steps S201 to S204 are common to those in FIG. 6A.

Upon reception of an inquiry about the name of the color profile 114 from the GDI 102 in step S204, the user interface driver 103 in this example returns an error. Or since this inquiry function itself is not prepared, the function call results in an error. The GDI 102 checks with reference to the return value in response to the function if the color profile name is returned (step S501). If one of the aforementioned errors has occurred, the GDI 102 determines that the color profile name is not returned.

If it is determined in step S501 that the user interface driver 103 does not return any color profile name, the GDI 102 searches color profiles 114 associated with the printer for an optimal color profile, and determines the found color profile as a color profile to be used (step S502). In this embodiment, since the associated color profile need to include the color profile 114 for previewing, the printer vendor must also provide this color profile for previewing as a part of the printer driver program. This color profile for previewing describes the resolution value for previewing as the resolution, but does not describe any paper type and halftone method values. In this way, since the resolution for previewing set in the DEVMODE in step S202 matches that described in the color profile for previewing, the GDI 102 can determine the color profile for previewing. Note that the color profile 114 for previewing does not describe any paper type and halftone method values, and the paper type and halftone method are used independently of their values.

Next, the GDI 102 executes color matching based on the color profile 114 determined in step S502 (step S503). If it is determined in step S501 that the color profile name is returned, the CDI 102 executes color matching using the color profile with the returned ID.

Step S207 and subsequent steps are common to those in FIG. 6B. As a result, since the preview file 109 stores image data which has undergone color matching using the color profile 114*a* for previewing, a preview image is displayed to have normal and natural colors.

The processing for printing spooled data will be described below with reference to FIG. 10. Steps S301 to S303 are common to those in FIG. 7. After the GDI 102 sends an inquiry about the color profile name in step S303, it checks if a color profile name is sent from the user interface driver 103 or this inquiry function itself is not prepared as in step S501 (step S601).

If an error returns or the inquiry function itself is not prepared, the GDI 102 searches the associated color profiles for a color profile to be used. In this embodiment, the associated color profiles 114 must be prepared in correspondence with the print resolutions, paper types, and halftone methods, and each color profile 114 describes the print resolution, paper type, and halftone method. However, when different paper sheets A and B have the same color characteristics and use the same color profile 114, if the paper type field of the DEVMODE describes the same value for paper sheets A and B, the number of color profiles can be reduced. Also, for example, when the color characteristics do not depend on any halftone method, the color profile 114 does not describe the halftone method. In this way, the color profiles 114 need not be prepared for respective halftone methods, and the number of color profiles 114 can be reduced.

Since the print resolution, paper type, and halftone method set in the DEVMODE are designated in step S301, the CDI 102 searches for a color profile 114 whose values match those of the DEVMODE, i.e., an optimal color profile, and determines it as the color profile to be used (step S602).

Next, the GDI 102 executes color matching based on the color profile 114 determined in step S602 (step S603). If it is determined in step S601 that the color profile name is returned, the GDI 102 executes color matching using the color profile with the returned ID. Step S306 and subsequent steps are common to those in FIG. 7.

As a result of the above processing, since the print result 110 of data, which is output to and printed by the printer 107, is obtained by printing rendering data that has undergone color matching using the color profile 114 for the printer 107, it is printed to have normal and natural colors.

As described above, according to this embodiment, a preview image can be normally displayed on the display at high speed while using the rendering function and color management function on the OS. For this reason, the preview image and print image match as well as the print settings unique to the printer driver. Also, expressed colors can be matched. Even when the user interface driver 103 does not return any response to the inquiry about the color profile name, the GDI can select and use an appropriate color profile.

Third Embodiment

The above embodiments have explained the method of executing color matching using a specific color profile 114 for previewing upon displaying a preview image. This embodiment will describe a method of displaying a preview image using a default color profile of the system. The color profiles 114 also include the default color profile of the system.

The application 101 normally displays data on the display 112 during creation of that data. At this time, when the application 101 does not make any designation about color management, default color profiles of the system are used as the source color profile that represents the color attribute (color space) upon creation of original data, and the device color profile of the display 112. For this reason, the preview image or print result may often be different from the display result 113 displayed on the display 112 by the application 101. Such phenomenon occurs since the application 101 does not support any color management, as described above. However, although one data is displayed on one display, it is not preferable that the data is displayed to have different colors by a data processing route that the user cannot know.

Hence, this embodiment executes previewing so that the display result 113 of the application 101 that does not support any color management and the preview result 111 are displayed to have the same colors. For this purpose, upon previewing, color matching is done using the default color profile 114 of the system.

A description of the same steps as in FIGS. 6A and 6B of the first embodiment will be omitted, and only different processes will be described hereinafter. Note that the source color profile 114 is changed by the same method as in the first embodiment.

Figure 12A:
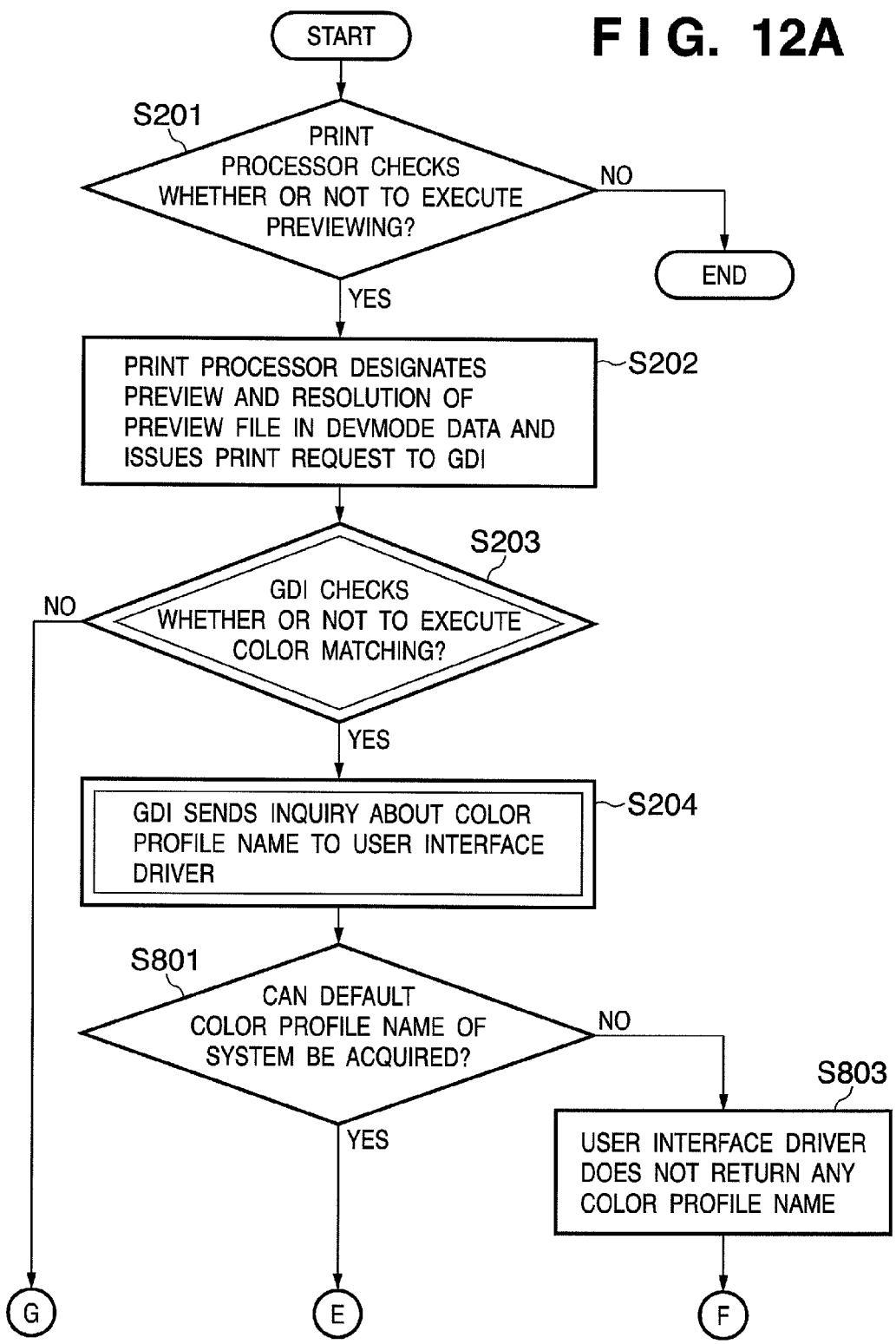
FIGS. 12A and 12B are flowcharts showing the sequence for previewing spooled data in the third embodiment.
Figure 12B:
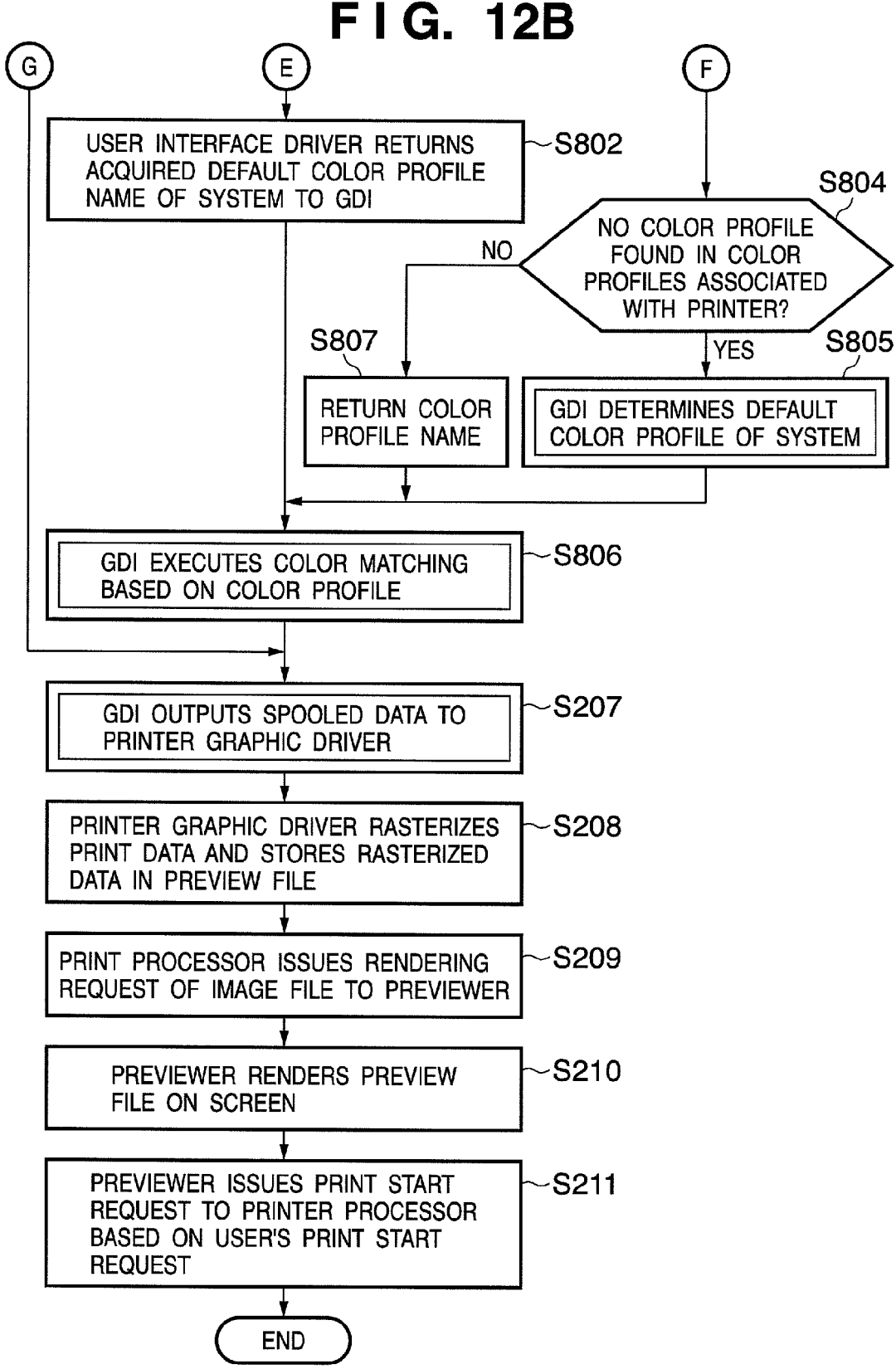

FIGS. 12A and 12B are flowcharts showing the sequence for previewing spooled data in this embodiment. Steps S201 to S204 are common to those in FIG. 6A. Upon reception of an inquiry about the name of the color profile 114 from the GDI 102 in step S204, the user interface driver 103 checks if the default color profile name of the system can be acquired. The acquisition method varies depending on OSs, and if the OS has a function of acquiring the default color profile 114 of the system, that default color profile is used. Since the default color profile of the system is fixed depending on the OS version, the default color profile name of the system can be acquired from the version of OS (step S801).

If the user interface driver 103 can acquire the default color profile name of the system in step 801, it returns the acquired default color profile name of the system to the GDI 102 (step S802).

If the user interface driver 103 cannot acquire the default color profile name of the system in step S801, it returns an error to the inquiry about the color profile name from the GDI 102. The user interface driver 103 does not return a color profile name (step S803).

If the user interface driver 103 does not return the name of any color profile 114 in step S803, the GDI 102 searches the associated color profiles for a color profile to be used. This embodiment does not have any color profile 114a for previewing as the associated color profiles. That is, all the associated color profiles describe the resolution for printing as a resolution to be supported, and do not include any color profile which matches the DEVMODE that has the preview setting in step S202. For this reason, the search processing of the GDI 102 fails. The user interface driver 103 checks in step S804 if the search processing of the GDI 102 has succeeded. If the corresponding color profile for previewing is found, the search processing has succeeded, and the user interface driver 103 returns its color profile name (ID) to the GDI 102 (step S807).

If it is determined in step S804 that the search processing has failed, the user interface driver 103 returns information indicating the failure to the GDI 102. Upon reception of that response from the user interface driver 103, the GDI 102 determines the default color profile 114 of the system as a color profile to be used (step S805), as described above in step S705.

Next, the GDI executes color matching using the color profile determined as that to be used (step S806). If the user interface driver 103 returns the default color profile name of the system and the search processing of the color profile name has failed, the GDI 102 executes color matching processing using the default color profile of the system.

As a result, when the user interface driver 103 can acquire the default color profile name of the system, the preview file 109 stores an image that has undergone color matching using the default color profile of the system. For this reason, the colors of the display result 113 of the application 101 that does not support color management match those of the preview image.

The processing upon printing is the same as that in the first or second embodiment. Hence, as the print result 110 of data which is output to and printed by the printer 107, an image that has undergone color matching using the color profile 114 for the printer 107 is output. For this reason, an image is printed to have natural and normal colors.

As described above, according to this embodiment, a preview image can be normally displayed on the display at high speed while using the rendering function and color management function on the OS. For this reason, the preview image and print image match as well as the print settings unique to the printer driver. Also, expressed colors can be matched. Even when the user interface driver 103 does not return any response to the inquiry about the color profile name, the GDI can select and use an appropriate color profile. Since the preview processing is done using the default color profile of the system, a preview image having the same colors as those of data displayed by the application program can be displayed.

Note that the objects of the present invention are also achieved by supplying a storage medium, which records a program code of a software program that can implement the functions of the above-mentioned embodiments (including the flowcharts shown in FIGS. 5 to 12B) to a system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention.

As the storage medium for supplying the program code, for example, a flexible disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-043162, filed Feb. 20, 2006, which is hereby incorporated by reference herein in its entirety.

What is claimed is:

1. A print control method comprising:
   a response step of returning a response to an inquiry about a color profile for printing without returning any response to an inquiry about a color profile for previewing;
   a preview step of displaying, when the response step does not return any response to the inquiry about the color profile for previewing, a preview based on data which has undergone color matching using a color profile with a preview resolution, that is found by a search; and an output step of outputting, when the response step returns the response to the inquiry about the color profile for printing, a printer command based on data which has undergone color matching using the color profile for printing.

2. A print control method comprising:

a response step of returning a response to an inquiry about a color profile for printing without returning any response to an inquiry about a color profile for previewing;

a preview step of displaying, when the response step does not return any response to the inquiry about the color profile for previewing, a preview based on data which has undergone color matching using a default color profile of a system; and an output step of outputting, when the response step returns the response to the inquiry about the color profile for printing, a printer command based on data which has undergone color matching using the color profile for printing.

3. A computer-readable recording medium which records a program for making a computer execute:

a response step of returning a response to an inquiry about a color profile for printing without returning any response to an inquiry about a color profile for previewing;

a preview step of displaying, when the response step does not return any response to the inquiry about the color profile for previewing, a preview based on data which has undergone color matching using a color profile with a preview resolution, that is found by a search; and an output step of outputting, when the response step returns the response to the inquiry about the color profile for printing, a printer command based on data which has undergone color matching using the color profile for printing.

4. A computer-readable recording medium which records a program for making a computer execute:

a response step of returning a response to an inquiry about a color profile for printing without returning any response to an inquiry about a color profile for previewing;

a preview step of displaying, when the response step does not return any response to the inquiry about the color profile for previewing, a preview based on data which has undergone color matching using a default color profile of a system; and an output step of outputting, when the response step returns the response to the inquiry about the color profile for printing, a printer command based on data which has undergone color matching using the color profile for printing.

5. A print control apparatus comprising:

a response unit constructed to return a response to an inquiry about a color profile for printing without returning any response to an inquiry about a color profile for previewing;

a preview unit constructed to, when said response unit does not return any response to the inquiry about the color profile for previewing, display a preview based on data which has undergone color matching using a color profile with a preview resolution, that is found by a search; and an output unit constructed to, when said response unit returns the response to the inquiry about the color profile for printing, output a printer command based on data which has undergone color matching using the color profile for printing.

6. A print control apparatus comprising:

a response unit constructed to return a response to an inquiry about a color profile for printing without returning any response to an inquiry about a color profile for previewing;

a preview unit constructed to, when said response unit does not return any response to the inquiry about the color profile for previewing, display a preview based on data which has undergone color matching using a default color profile of a system; and an output unit constructed to, when said response unit returns the response to the inquiry about the color profile for printing, output a printer command based on data which has undergone color matching using the color profile for printing.

* * * * *